Patented July 27, 1937

2,088,014

UNITED STATES PATENT OFFICE 2,088,014

PRODUCTION OF SULPHURIC ACID DERIVATIVES OF SECONDARY ALCOHOLS

Jacob N. Wickert, Charleston, and Benjamin T. Freure, South Charleston, W. Va., assignors, by mesne assignments, to Union Carbide and Carbon Corporation, a corporation of New York No Drawing. Application January 5, 1934, Serial No. 705,398

12 Claims. (Cl. 260—99.12)

This invention relates to sulphuric acid derivatives of a saturated secondary branched-chain tetradecanol, which derivatives have valuable detergent properties, as well as important wetting, impregnating, foaming and emulsifying properties rendering them useful in the preparation of treatment liquids in the textile, leather and other industries. The compounds have special utility in the preparation of detergents useful with or as substitutes for soap. The invention also includes a process for making these important compounds.

The new unsaturated tetradecyl ketone used as a starting material for the sulphation can be prepared by the interaction of methylisobutylketone, $$CH_3-CO-CH_2-CH(CH_3)_2$$

with ethylhexaldehyde, $$C_4H_9-CH(C_2H_5)-CHO$$

or with ethylpropylacrolein, $$C_3H_7-CH:C(C_2H_5)-CHO$$

in the presence of an alkali such as caustic potash.

The methylisobutylketone may be prepared by the reaction of acetone with itself in the presence of mild alkalies to form diacetonealcohol. This is then dehydrated and subsequently hydrogenated to produce methylisobutylketone.

The ethylpropylacrolein can be produced by condensing butyraldehyde by the addition of one molecule of the butyraldehyde to the second carbon atom of a like molecule, forming an aldol which then loses the elements of water to form the unsaturated aldehyde, ethylpropylacrolein. The latter, when hydrogenated, is converted to ethylhexaldehyde.

The present invention is based in part upon the discovery that methylisobutylketone will react with either ethylhexaldehyde or ethylpropylacrolein to form a ketol which, upon dehydration produces an unsaturated ketone. The latter, upon hydrogenation, yields a saturated 14 carbon ketone and a 14 carbon secondary alcohol. The reactions involved in this synthesis with ethylhexaldehyde may be represented as follows:

$$CH_3.CO.CH_2.CH(CH_3)_2 + C_4H_9.CH(C_2H_5).CHO \rightarrow$$
$$CH_3.CH(CH_3)CH_2.CO.CH_2.CHOH.CH(C_2H_5)C_4H_9$$
ketol (dehydration) →CH<sub>3</sub>—CH(CH<sub>3</sub>).
CH<sub>2</sub>.CO.CH:CH.CH(C<sub>2</sub>H<sub>5</sub>) C<sub>4</sub>H<sub>9</sub>
(7-ethyl-2-methylundecene-5, one-4)

(partial hydrogenation) →CH<sub>3</sub>.CH(CH<sub>3</sub>).
CH<sub>2</sub>.CO.CH<sub>2</sub>.CH<sub>2</sub>.CH(C<sub>2</sub>H<sub>5</sub>) C<sub>4</sub>H<sub>9</sub>
(7-ethyl-2-methylundecanone-4)

(hydrogenation) →CH<sub>3</sub>.CH(CH<sub>3</sub>).CH<sub>2</sub>.
CHOH.CH<sub>2</sub>.CH<sub>2</sub>.CH(C<sub>2</sub>H<sub>5</sub>) C<sub>4</sub>H<sub>9</sub>
(7-ethyl-2-methylundecanol-4)

This alcohol, upon subsequent sulphation, as with concentrated sulphuric acid, produces the monosulphate of this new tetradecyl alcohol, which is then converted into the salt of the alkylsulphuric ester by treatment with the appropriate base, such as a caustic alkali solution. The sodium sulphate of this tetradecyl alcohol is a clear, snow-white solid or wax. It is completely soluble in water and in methanol; and its solutions are effective detergents. Its water solution when shaken produces a voluminous stable foam.

The process is illustrated by the following example:

8.7 kg. of methylisobutylketone was mixed in the cold with 105 grams of caustic potash dissolved in 1750 c. c. of methanol, in a reaction vessel provided with a cooling coil and agitating means. 3.7 kg. of ethylhexaldehyde was then added slowly to the resultant liquid with constant stirring over a period of a half hour while the temperature was maintained below around 25° C. The reaction product first formed was in the nature of a ketol having the probable composition:

$$CH_3.CH(CH_3) CH_2.CO.CH_2.CHOH.CH(C_2H_5) C_4H_9$$

As the reaction continued the ketol formed was dehydrated to form the corresponding unsaturated ketone, $$CH_3.CH(CH_3) CH_2.CO.CH:CH.CH(C_2H_5) C_4H_9$$

After the reaction mixture had been stirred for fifteen hours to complete the condensation, it was made slightly acid to phenolphthalein by means of a 25% aqueous solution of sulphuric acid. Potassium sulphate separated and was filtered off. The clear filtrate was heated to strip it of unreacted starting material and of the water formed when the ketol was heated in the presence of the slight sulphuric acid acidity. The residue consisted chiefly of the unsaturated ketone. This was freed of acid by washing with dilute aqueous caustic soda solution. The resultant neutral solution was distilled under reduced pressure to yield the pure ketone, which boils at 117° to 120° C. at 7 mm. absolute pressure, and at 256° C. at 760 mm. pressure. It has a sp. gr. of .842 at 20° C.

This ketone was then charged into a pressure vessel, together with an active nickel catalyst and was heated to 100° to 125° C. with shaking, in the presence of an excess of hydrogen at 900 to 1000 pounds gauge pressure. Reduction of the ketone was continued for sixteen hours until no further hydrogen was absorbed. The liquid product was then cooled, filtered to remove the catalyst, and the filtrate was purified by fractional distillation. The product will contain varying proportions of a saturated ketone and of the secondary tetradecyl alcohol depending upon the extent of the hydrogenation. The fraction having a boiling point of 101° to 103° C. at 4 mm. pressure, and of 252° to 253° C. at 760 mm. pressure, and a sp. gr. of .834 at 20° C. is a saturated ketone, apparently being 7-ethyl-2 methylundecanone-4. The fraction boiling at 112° to 114° C. at 4 mm., and at 261° to 262° C. at 760 mm. absolute pressure, has a sp. gr. of .834 at 20° C. and is a secondary tetradecyl alcohol, apparently 7-ethyl-2 methylundecanol-4.

It is possible to substitute ethylpropylacrolein in the process, in place of the ethylhexaldehyde mentioned in the above example. For instance, 1.8 kg. methylisobutylketone can be reacted with .75 kg. ethylpropylacrolein in the presence of 300 c. c. of normal methanolic caustic soda solution, the conditions under which the reaction and subsequent steps are conducted being the same as set out in the former example. In this modification the unsaturated ketol first formed has the probable composition:

but by dehydration is converted to a doubly unsaturated ketone having the probable structure indicated by the designation 7-ethyl-2 methylundecadiene 5, 7,-one 4. This ketone is obtained from the neutral residue from the caustic soda neutralization by distillation of this residue under reduced pressure. It boils at 155° to 160° C. at 22 mm. absolute pressure, and at 270° C. at 760 mm. pressure; and has a sp. gr. at 20° C. of .880.

Hydrogenation of this unsaturated ketone in the manner indicated in the example produces the saturated ketone and secondary tetradecyl alcohol described above.

In practicing the next step of the process, the secondary tetradecyl alcohol is sulphated to produce valuable detergents and emulsifying agents. While several known sulphating methods may be satisfactorily utilized, the best yields are secured by reacting the tetradecyl alcohol with approximately an equivalent amount of concentrated sulphuric acid (90 to 95%) in the presence of acetic anhydride, the temperature during the reaction being maintained low, preferably from 0° to 10° C. The concentration of the sulphuric acid can vary considerably; and other anhydrides of organic acids, or the acids themselves or their chlorides, may be substituted for acetic anhydride.

The sulphate thus produced is then treated with an aqueous solution of a caustic alkali or other base to convert it to the sodium or other salt. This is then readily salted out of the solution and recovered. The sodium salt of the monosulphate is a clear, snow-white, wax-like solid. It is completely soluble in water and in methanol and is not precipitated by dilute acids or alkalis. The various calcium and magnesium salts present in hard waters are not precipitated by this compound, since its calcium and magnesium salts are almost as soluble as the sodium salt itself. A voluminous stable foam is produced when its water solution is shaken; and it readily yields a stable lather in sea water or other solution having a high percentage of soluble salts. Its properties therefore render it particularly useful as a wetting and detergent agent.

The following will illustrate one manner of carrying out the sulphation step of our process:

107 grams (0.5 mol) of tetradecyl alcohol prepared in the manner described supra is slowly added to a mixture of 59.2 grams (.58 mol) of acetic anhydride and 60 grams (.58 mol) concentrated (95%) sulphuric acid during a period of an hour, while maintaining the temperature between 0° to 10° C. After completion of the reaction, the resultant water-soluble mixture is neutralized with a 10% aqueous solution of caustic soda while cooling and agitating the same. Upon subsequent standing,—the detergent sulphate floats to the top and is skimmed off as a soft, pasty mass. The latter is taken up in dry methanol, filtered, and the resultant filtrate diluted with water in the ratio of two volumes of the solution to one volume of water. The resultant cloudy solution is extracted with hexane to remove olefine and unreacted alcohol. Upon evaporation of the methanol-water solution to dryness, under reduced pressure, the detergent sulphate is obtained as a white, dry powder. Other purification methods may be substituted for that here given.

Other proportions of the above reagents besides those recited may be effectively employed in this sulphation step. For instance, good yields of the sulphuric acid ester of the alcohol have been secured, using 1 mol of acetic anhydride, 1 mol 95% sulphuric acid, and .5 mol of the tetradecyl alcohol, in the specific manner described supra.

The sulphation of the alcohol also may be effected by other means, as by treatment with chlorosulphonic acid, using carbon terachloride or dichlorethyl ether as solvents; or by a treatment with one or more molar equivalents of around 90 to 95% strength sulphuric acid, at low temperatures, preferably between 0° to 10° C. In the latter case the reaction mixture on settling separates into a sulphuric acid layer and an upper layer of acid sulphates. This latter layer was neutralized with aqueous caustic alkali, and extracted with hot water to separate therefrom insoluble impurities. The combined washings were evaporated to dryness under reduced pressure, extracted with methanol to remove sodium sulphate, and again dried,—yielding a clear, white, waxy, water-soluble solid having the desired detergent properties.

The process may be varied by substituting for the methanol in the ketol-forming reaction, other volatile diluents for the ketone and alkali starting materials, which do not take part in the reaction, such as ethanol.

The nickel catalyst can be replaced by other catalysts known to catalyze the hydrogenation of alcohols, as for example, copper, platinum, palladium, and copper chromite.

We claim:

1. A composition of matter identical with a salt of the product resulting from the sulphation of a secondary branched-chain tetradecanol-4, the same being a solid, completely soluble in water and in methanol.

2. A composition of matter identical with an alkali metal salt of the monosulphate resulting from the sulphation of a saturated secondary branched-chain tetradecanol-4 at a low temperature, the same being a solid, soluble in water and in methanol, and capable when shaken in water solution of producing a voluminous stable foam.

3. In the process of producing a sulphate ester of a secondary alcohol, the steps of sulphating a saturated, branched-chain secondary tetradecanol-4, and forming an alkali metal or alkaline earth metal salt of the resultant monosulphate of the said alcohol.

4. In the process of producing an alkyl sulphate of a secondary alcohol, the steps of reacting together methylisobutylketone and an aliphatic aldehyde having at least 8 carbon atoms in each molecule, eliminating the elements of water from the resultant reaction product, separating the unsaturated ketone thereby produced, hydrogenating the latter in the presence of a catalyst to form a secondary tetradecyl alcohol, sulphating the latter, thereby producing a monosulphate of the tetradecyl alcohol, treating the said monosulphate with a water-soluble compound of a metal, thereby producing the corresponding salt of the monosulphate, and recovering the latter.

5. In the process of producing a sulphate ester of a secondary alcohol, the steps of reacting together methylisobutylketone and ethylpropylacrolein, eliminating the elements of water from the reaction product, thereby producing an unsaturated ketone having a boiling point of 270° C. at atmospheric pressure, hydrogenating the latter in the presence of a hydrogenation catalyst, and sulphating the resultant secondary branched-chain tetradecyl alcohol.

6. A sulphuric acid ester of a saturated branched-chain, secondary tetradecanol-4.

7. A neutral sulphate ester of a saturated branched-chain, secondary tetradecanol-4.

8. As a new compound, a water-soluble salt of a sulphated saturated secondary branched-chain alcohol having 14 carbon atoms in its molecular structure.

9. A composition of matter identical with a water-soluble salt of the product resulting from the sulphation of a saturated secondary branched-chain tetradecanol-4, the same being a solid, completely soluble in water and in methanol.

10. In the process of producing a sulphate ester of a secondary alcohol, the steps of reacting together methylisobutylketone and 2-ethylhexaldehyde, eliminating the elements of water from the reaction product, separating therefrom an unsaturated ketone having a boiling point of about 256° C. at atmospheric pressure, hydrogenating the latter, thereby producing a saturated secondary branched-chain aliphatic tetradecanol-4, sulphating the latter, and recovering the resultant sulphate ester.

11. As a chemical compound, a water-soluble sulphate ester of 7-ethyl 2-methylundecanol-4.

12. In the process of producing a sulphate ester of a tetradecanol-4, the steps of reacting together methylisobutylketone and ethylpropylacrolein, eliminating the elements of water from the reaction product, thereby producing an unsaturated ketone having a boiling point of 270° C. at atmospheric pressure, hydrogenating the said ketone thereby forming a saturated branched-chain tetradecanol-4, sulphating the latter at a low temperature thereby producing a monosulphate ester of the said tetradecanol-4, and recovering the said ester.

JACOB N. WICKERT.
BENJAMIN T. FREURE.